(12) United States Patent
Dell et al.

(10) Patent No.: US 8,201,069 B2
(45) Date of Patent: Jun. 12, 2012

(54) CYCLICAL REDUNDANCY CODE FOR USE IN A HIGH-SPEED SERIAL LINK

(75) Inventors: Timothy J. Dell, Colchester, VT (US); Kevin C. Gower, LaGrangeville, NY (US); Luis A. Lastras-Montano, Cordlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 12/166,207

(22) Filed: Jul. 1, 2008

(65) Prior Publication Data

US 2010/0005375 A1 Jan. 7, 2010

(51) Int. Cl.
*G06F 11/10* (2006.01)
*H03M 13/00* (2006.01)

(52) U.S. Cl. .................... 714/807; 714/751; 714/781

(58) Field of Classification Search .............. 714/751, 714/681, 807
See application file for complete search history.

(56) References Cited

U.S. PATENT DOCUMENTS

| | | | |
|---|---|---|---|
| 4,034,195 A | 7/1977 | Bates | |
| 4,376,306 A | 3/1983 | Giusto | |
| 4,468,770 A | 8/1984 | Metcalf et al. | |
| 4,631,686 A | 12/1986 | Ikawa et al. | |
| 4,644,498 A | 2/1987 | Bedard et al. | |
| 4,775,979 A | 10/1988 | Oka | |
| 5,321,813 A | 6/1994 | McMillen et al. | |
| 5,513,135 A | 4/1996 | Dell et al. | |
| 6,067,262 A | 5/2000 | Irrinki et al. | |
| 6,070,256 A | 5/2000 | Wu et al. | |
| 6,119,181 A | 9/2000 | Vorbach et al. | |
| 6,147,967 A | 11/2000 | Ying et al. | |
| 6,297,995 B1 | 10/2001 | McConnell et al. | |
| 6,308,286 B1 | 10/2001 | Richmond et al. | |
| 6,337,817 B1 | 1/2002 | Horiguchi et al. | |
| 6,338,154 B2 | 1/2002 | Kim | |
| 6,367,042 B1 | 4/2002 | Phan et al. | |
| 6,381,685 B2 | 4/2002 | Dell et al. | |
| 6,518,593 B2 | 2/2003 | Takabayashi et al. | |
| 6,526,461 B1 | 2/2003 | Cliff | |
| 6,531,339 B2 | 3/2003 | King et al. | |

(Continued)

FOREIGN PATENT DOCUMENTS

EP 0883260 A2 12/1998

(Continued)

OTHER PUBLICATIONS

G. Boudon et al., "Novel Bus Reconfiguration Scheme With Spare Lines", IBM Technical Bulletin, May 1987, pp. 5590-5593.

(Continued)

*Primary Examiner* — Sam Rizk
(74) *Attorney, Agent, or Firm* — Cantor Colburn LLP (57) ABSTRACT

A system and method for providing a cyclical redundancy code (CRC) for use in a high-speed serial link. The system includes a cascade interconnect memory system including a memory controller, a memory hub device and a downstream link. The downstream link is in communication with the memory controller and the memory hub device and includes at least thirteen signal lanes for transmitting a multiple transfer downstream frame from the memory controller to the memory hub device. A portion of the downstream frame includes downstream CRC bits to detect errors in the downstream frame. The downstream CRC bits capable of detecting any one of a lane failure, a transfer failure and up to five bit random errors.

20 Claims, 5 Drawing Sheets

U.S. PATENT DOCUMENTS

| | | |
|---|---|---|
| 6,789,212 B1 | 9/2004 | Klingman |
| 6,895,528 B2 | 5/2005 | Cantwell et al. |
| 6,931,564 B2 | 8/2005 | Goodman et al. |
| 6,973,605 B1 | 12/2005 | Templeton et al. |
| 7,013,416 B2 | 3/2006 | Whetsel |
| 7,058,918 B2 | 6/2006 | Abramovici et al. |
| 7,069,494 B2 | 6/2006 | Cargnoni et al. |
| 7,154,723 B1 | 12/2006 | Warnakulasooriya et al. |
| 7,168,005 B2 | 1/2007 | Adams et al. |
| 7,178,076 B1 | 2/2007 | Zarrineh et al. |
| 7,181,659 B2 | 2/2007 | Bravo et al. |
| 7,277,346 B1 | 10/2007 | Rahim et al. |
| 7,299,313 B2 | 11/2007 | Gower et al. |
| 7,334,149 B1 | 2/2008 | Wu |
| 7,353,316 B2 | 4/2008 | Erdmann |
| 7,362,697 B2 | 4/2008 | Becker et al. |
| 2002/0024455 A1 | 2/2002 | Abbiate et al. |
| 2002/0075982 A1 | 6/2002 | Doblar |
| 2003/0074619 A1 | 4/2003 | Dorsey |
| 2003/0185251 A1 | 10/2003 | Ichino et al. |
| 2004/0180455 A1 | 9/2004 | Marr |
| 2004/0190331 A1 | 9/2004 | Ross et al. |
| 2004/0216026 A1 | 10/2004 | Ferraiolo et al. |
| 2004/0250181 A1 | 12/2004 | Vogt et al. |
| 2005/0138496 A1 | 6/2005 | Brennan et al. |
| 2005/0174138 A1 | 8/2005 | Marr |
| 2005/0210185 A1 | 9/2005 | Renick |
| 2005/0223196 A1 | 10/2005 | Knowles |
| 2005/0246597 A1 | 11/2005 | Whetsel |
| 2006/0036827 A1 | 2/2006 | Dell et al. |
| 2006/0095620 A1 | 5/2006 | Dreps et al. |
| 2006/0107175 A1 | 5/2006 | Dell et al. |
| 2006/0179369 A1 | 8/2006 | Bravo et al. |
| 2006/0179394 A1 | 8/2006 | O'Neill et al. |
| 2006/0218455 A1 | 9/2006 | LeClair et al. |
| 2006/0277363 A1 | 12/2006 | Qui et al. |
| 2007/0011562 A1* | 1/2007 | Alexander et al. ............ 714/758 |
| 2007/0075734 A1 | 4/2007 | Ramos et al. |
| 2007/0204190 A1 | 8/2007 | Hesse et al. |
| 2007/0283223 A1 | 12/2007 | Dell et al. |
| 2007/0288816 A1 | 12/2007 | Nakanishi |
| 2007/0300129 A1 | 12/2007 | Dell et al. |
| 2008/0005644 A1 | 1/2008 | Dell |
| 2008/0005647 A1* | 1/2008 | Bains ........................... 714/781 |
| 2008/0022186 A1 | 1/2008 | Co et al. |
| 2008/0028345 A1 | 1/2008 | Suri et al. |
| 2008/0046774 A1 | 2/2008 | Hirai et al. |
| 2008/0046796 A1 | 2/2008 | Dell et al. |
| 2008/0065938 A1 | 3/2008 | Cowell et al. |
| 2008/0115137 A1 | 5/2008 | Gower et al. |

FOREIGN PATENT DOCUMENTS

| | | |
|---|---|---|
| EP | 1622020 A2 | 2/2006 |
| EP | 1653369 A2 | 5/2006 |
| JP | 02-307254 | 12/1990 |
| JP | 03-234125 | 10/1991 |
| JP | 09-261210 | 10/1997 |

OTHER PUBLICATIONS

Sunggu Lee, et al., "Probabilistic Diagnosis of Multiprocessor Systems", ACM Computing Surveys, Mar. 1994, pp. 121-139, vol. 26, No. 1.

Alan Charlesworth et al., "The Starfire SMP Interconnect", 1997, pp. 1-20, ACM.

Daniele Rossi et al., "New ECC for Crosstalk Impact Minimization", Jul./Aug. 2005, pp. 340-348 IEEE CS and the IEEE CASS.

Smitha Shyam et al., "Ultra Low-Cost Defect Protection for Microprocessor Pipelines", ASPLOS' 06, Oct. 21-25, 2006, pp. 73-82, ACM, San Jose, California, USA.

D.M Berger et al., "High-Speed source-synchronous interface for the IBM System z9 processor" IBM J. Res & Dev., Jan. 2007, pp. 53-64, vol. 51, No. 1/2, IBM.

FBDIMM: Architecture and Protocal, Jan. 2007, JESD206, JEDEC Solid State Technology Association, Arlington, VA USA.

* cited by examiner

FIG. 1

| 8 transfer frame |||||||||||||||
|---|---|---|---|---|---|---|---|---|---|---|---|---|---|---|
| | | Downstream Channel Lanes |||||||||||||
| | | 12 | 11 | 10 | 9 | 8 | 7 | 6 | 5 | 4 | 3 | 2 | 1 | 0 |
| BLOCK1 | 0 | 104 | 105 | 106 | 107 | 108 | 109 | 110 | 111 | 112 | 113 | 114 | 115 | 116 |
| | 1 | 117 | 118 | 119 | 120 | 121 | 122 | 123 | 124 | 125 | 126 | 127 | 128 | 129 |
| | 2 | 130 | 131 | 132 | 133 | 134 | 135 | 136 | 137 | 138 | 139 | 140 | 141 | 142 |
| | 3 | 143 | 144 | 145 | 146 | 147 | 148 | 149 | 150 | 151 | 152 | 153 | 154 | 155 |
| BLOCK0 | 0 | crc00 | crc01 | crc02 | crc03 | 160 | 161 | 162 | 163 | 164 | 165 | 166 | 167 | 168 |
| | 1 | crc04 | crc05 | crc06 | crc07 | 173 | 174 | 175 | 176 | 177 | 178 | 179 | 180 | 181 |
| | 2 | crc08 | crc09 | crc10 | crc11 | crc12 | 187 | 188 | 189 | 190 | 191 | 192 | 193 | 194 |
| | 3 | crc13 | crc14 | crc15 | crc16 | crc17 | 200 | 201 | 202 | 203 | 204 | 205 | 206 | 207 |

FIG. 2

| 12 transfer frame |||||||||||||||
|---|---|---|---|---|---|---|---|---|---|---|---|---|---|---|
| | | Downstream Channel Lanes |||||||||||||
| | | 12 | 11 | 10 | 9 | 8 | 7 | 6 | 5 | 4 | 3 | 2 | 1 | 0 |
| BLOCK2 | 0 | 52 | 53 | 54 | 55 | 56 | 57 | 58 | 59 | 60 | 61 | 62 | 63 | 64 |
| | 1 | 65 | 66 | 67 | 68 | 69 | 70 | 71 | 72 | 73 | 74 | 75 | 76 | 77 |
| | 2 | 78 | 79 | 80 | 81 | 82 | 83 | 84 | 85 | 86 | 87 | 88 | 89 | 90 |
| | 3 | 91 | 92 | 93 | 94 | 95 | 96 | 97 | 98 | 99 | 100 | 101 | 102 | 103 |
| BLOCK1 | 0 | 104 | 105 | 106 | 107 | 108 | 109 | 110 | 111 | 112 | 113 | 114 | 115 | 116 |
| | 1 | 117 | 118 | 119 | 120 | 121 | 122 | 123 | 124 | 125 | 126 | 127 | 128 | 129 |
| | 2 | 130 | 131 | 132 | 133 | 134 | 135 | 136 | 137 | 138 | 139 | 140 | 141 | 142 |
| | 3 | 143 | 144 | 145 | 146 | 147 | 148 | 149 | 150 | 151 | 152 | 153 | 154 | 155 |
| BLOCK0 | 0 | crc00 | crc01 | crc02 | crc03 | 160 | 161 | 162 | 163 | 164 | 165 | 166 | 167 | 168 |
| | 1 | crc04 | crc05 | crc06 | crc07 | 173 | 174 | 175 | 176 | 177 | 178 | 179 | 180 | 181 |
| | 2 | crc08 | crc09 | crc10 | crc11 | crc12 | 187 | 188 | 189 | 190 | 191 | 192 | 193 | 194 |
| | 3 | crc13 | crc14 | crc15 | crc16 | crc17 | 200 | 201 | 202 | 203 | 204 | 205 | 206 | 207 |

FIG. 3

| 16 transfer frame |||||||||||||||
|---|---|---|---|---|---|---|---|---|---|---|---|---|---|---|
| Downstream Channel Lanes |||||||||||||||
| | | 12 | 11 | 10 | 9 | 8 | 7 | 6 | 5 | 4 | 3 | 2 | 1 | 0 |
| BLOCK3 | 0 | 0 | 1 | 2 | 3 | 4 | 5 | 6 | 7 | 8 | 9 | 10 | 11 | 12 |
| | 1 | 13 | 14 | 15 | 16 | 17 | 18 | 19 | 20 | 21 | 22 | 23 | 24 | 25 |
| | 2 | 26 | 27 | 28 | 29 | 30 | 31 | 32 | 33 | 34 | 35 | 36 | 37 | 38 |
| | 3 | 39 | 40 | 41 | 42 | 43 | 44 | 45 | 46 | 47 | 48 | 49 | 50 | 51 |
| BLOCK2 | 0 | 52 | 53 | 54 | 55 | 56 | 57 | 58 | 59 | 60 | 61 | 62 | 63 | 64 |
| | 1 | 65 | 66 | 67 | 68 | 69 | 70 | 71 | 72 | 73 | 74 | 75 | 76 | 77 |
| | 2 | 78 | 79 | 80 | 81 | 82 | 83 | 84 | 85 | 86 | 87 | 88 | 89 | 90 |
| | 3 | 91 | 92 | 93 | 94 | 95 | 96 | 97 | 98 | 99 | 100 | 101 | 102 | 103 |
| BLOCK1 | 0 | 104 | 105 | 106 | 107 | 108 | 109 | 110 | 111 | 112 | 113 | 114 | 115 | 116 |
| | 1 | 117 | 118 | 119 | 120 | 121 | 122 | 123 | 124 | 125 | 126 | 127 | 128 | 129 |
| | 2 | 130 | 131 | 132 | 133 | 134 | 135 | 136 | 137 | 138 | 139 | 140 | 141 | 142 |
| | 3 | 143 | 144 | 145 | 146 | 147 | 148 | 149 | 150 | 151 | 152 | 153 | 154 | 155 |
| BLOCK0 | 0 | crc00 | crc01 | crc02 | crc03 | 160 | 161 | 162 | 163 | 164 | 165 | 166 | 167 | 168 |
| | 1 | crc04 | crc05 | crc06 | crc07 | 173 | 174 | 175 | 176 | 177 | 178 | 179 | 180 | 181 |
| | 2 | crc08 | crc09 | crc10 | crc11 | crc12 | 187 | 188 | 189 | 190 | 191 | 192 | 193 | 194 |
| | 3 | crc13 | crc14 | crc15 | crc16 | crc17 | 200 | 201 | 202 | 203 | 204 | 205 | 206 | 207 |

| Transfer | | Upstream Channel Lanes | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 |
| | 0 | 0 | 1 | 2 | 3 | 4 | 5 | 6 | 7 | 8 | 9 | 10 | 11 | 12 | 13 | 14 | 15 | 16 | 17 | 18 | 19 |
| | 0 | 0 | 8 | 16 | 24 | 32 | 40 | 48 | 56 | 64 | 72 | 80 | 88 | 96 | 104 | 112 | 120 | 128 | 136 | crc0 | crc8 |
| | 1 | 1 | 9 | 17 | 25 | 33 | 41 | 49 | 57 | 65 | 73 | 81 | 89 | 97 | 105 | 113 | 121 | 129 | 137 | crc1 | crc9 |
| | 2 | 2 | 10 | 18 | 26 | 34 | 42 | 50 | 58 | 66 | 74 | 82 | 90 | 98 | 106 | 114 | 122 | 130 | 138 | crc2 | crc10 |
| | 3 | 3 | 11 | 19 | 27 | 35 | 43 | 51 | 59 | 67 | 75 | 83 | 91 | 99 | 107 | 115 | 123 | 131 | 139 | crc3 | crc11 |
| | 4 | 4 | 12 | 20 | 28 | 36 | 44 | 52 | 60 | 68 | 76 | 84 | 92 | 100 | 108 | 116 | 124 | 132 | 140 | crc4 | crc12 |
| | 5 | 5 | 13 | 21 | 29 | 37 | 45 | 53 | 61 | 69 | 77 | 85 | 93 | 101 | 109 | 117 | 125 | 133 | 141 | crc5 | crc13 |
| | 6 | 6 | 14 | 22 | 30 | 38 | 46 | 54 | 62 | 70 | 78 | 86 | 94 | 102 | 110 | 118 | 126 | 134 | 142 | crc6 | crc14 |
| | 7 | 7 | 15 | 23 | 31 | 39 | 47 | 55 | 63 | 71 | 79 | 87 | 95 | 103 | 111 | 119 | 127 | 135 | 143 | crc7 | crc15 |

FIG. 6

CYCLICAL REDUNDANCY CODE FOR USE IN A HIGH-SPEED SERIAL LINK

BACKGROUND

This invention relates generally to computer memory systems, and more particularly to a cyclical redundancy code for use in a high-speed serial link.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

SUMMARY

An exemplary embodiment includes a cascade interconnect memory system. The memory system includes a memory controller, a memory hub device and a downstream link. The downstream link is in communication with the memory controller and the memory hub device and includes at least thirteen signal lanes for transmitting a multiple transfer downstream frame from the memory controller to the memory hub device. A portion of the downstream frame includes downstream cyclical redundancy code (CRC) bits to detect errors in the downstream frame. The downstream CRC bits capable of detecting any one of a lane failure, a transfer failure and up to five bit random errors.

Another exemplary embodiment includes a cascade interconnect memory system. The memory system includes a memory controller, a memory hub device and an upstream link. The upstream link is in communication with the memory controller and the memory hub device and includes at least twenty signal lanes for transmitting an eight transfer upstream frame from the memory hub device to the memory controller. A portion of the upstream frame includes upstream CRC bits to detect errors in the upstream frame. The upstream CRC bits capable of detecting any one of a lane failure, and up to four bit random errors.

A further exemplary embodiment includes a method for providing CRC coverage for a downstream multiple transfer frame. The method includes selectively choosing locations for CRC bits in the downstream frame to provide coverage for any one of a lane failure, a transfer failure and up to five bit random errors.

A still further exemplary embodiment includes a method for providing CRC coverage for a multiple transfer frame having multiple bit lanes. The method includes generating a CRC with at least the largest of T and N checkbits, such that the CRC detects any transfer error as well as any lane error. T is the number of transfers in the frame and N is the number of bit lanes.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention is a specialized cyclical redundancy code (CRC) to detect errors on a bus in communications or computer systems. The specialized bus CRC that may be implemented by exemplary embodiments provides dynamic, multi-dimensional coverage by including CRC detection along both axes of data packets of varying lengths. Exemplary embodiments include both downstream and upstream CRCs.

Figure 1:
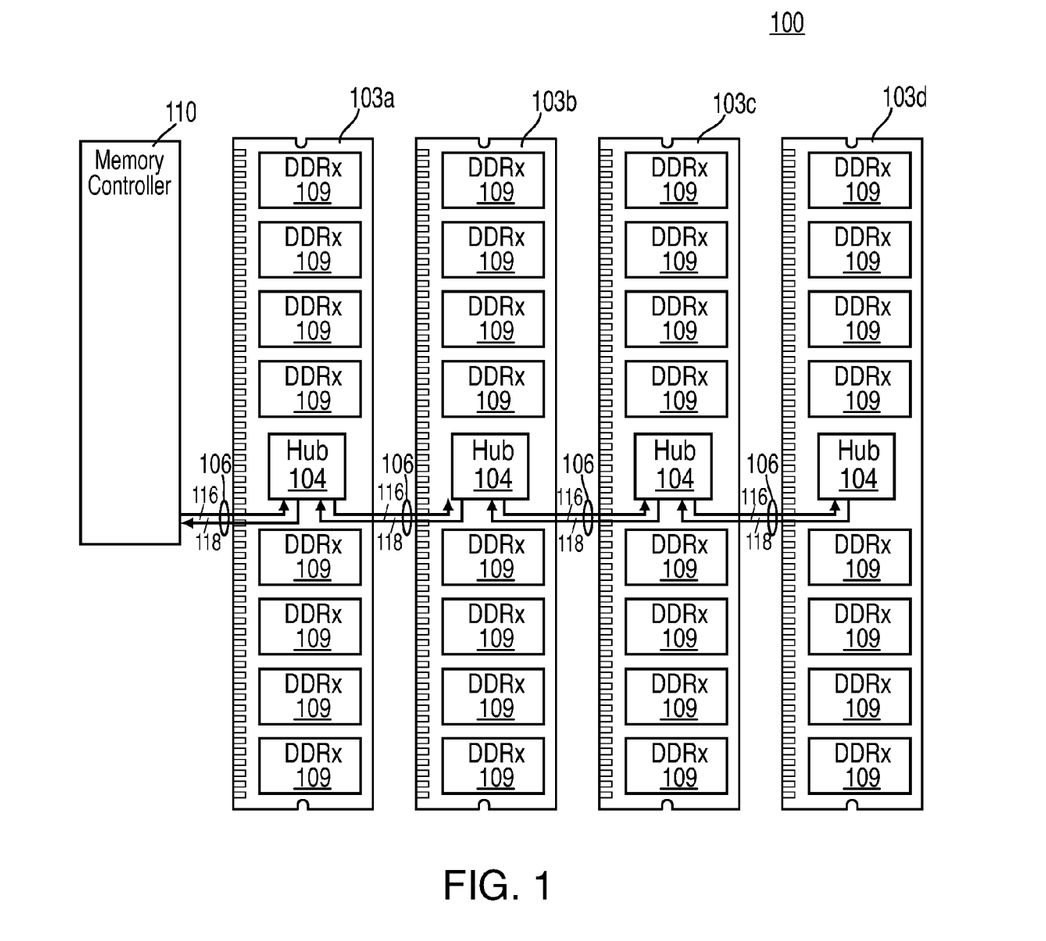
FIG. 1 depicts a cascade interconnect memory system that may be implemented by an exemplary embodiment.

Turning now to FIG. 1, an example of a memory system 100 that includes fully buffered dual in-line memory modules (DIMMs) communicating via a high-speed channel and using the specialized bus CRC described herein. The memory system 100 may be incorporated in a host processing system as main memory for the processing system. The memory system 100 includes a number of DIMMs 103a, 103b, 103c and 103d with memory hub devices 104 communicating via a channel 106 or a cascade-interconnected bus (made up of a differential unidirectional upstream bus 118 and a differential unidirectional downstream bus 116). The DIMMs 103a-103d can include multiple memory devices 109, which may be double data rate (DDR) dynamic random access memory (DRAM) devices, as well as other components known in the art, e.g., resistors, capacitors, etc. The memory devices 109 are also referred to as DRAM 109 or DDRx 109, as any version of DDR may be included on the DIMMs 103a-103d, e.g., DDR2, DDR3, DDR4, etc. A memory controller 110 interfaces with DIMM 103a, sending commands, address and data values via the channel 106 that may target any of the DIMMs 103a-103d. The commands, address and data values may be formatted as frames and serialized for transmission at a high data rate.

In an exemplary embodiment, when a DIMM receives a frame from an upstream DIMM or the memory controller 110, it redrives the frame to the next DIMM in the daisy chain (e.g., DIMM 103a redrives to DIMM 103b, DIMM 103b redrives to DIMM 103c, etc.). At the same time, the DIMM decodes the frame to determine the contents. Thus, the redrive and command decode at a DIMM can occur in parallel, or nearly in parallel. If the command is a read request, all DIMMS 103a-103d and the memory controller 110 utilize contents of the command to keep track of read data traffic on the upstream bus 118.

The hub devices 104 on the DIMMs receive commands via a bus interface (e.g. a port) to the channel 106. The bus interface on the hub device 104 includes, among other components, a receiver and a transmitter. In an exemplary embodiment, a hub device 104 includes both an upstream bus interface for communicating with an upstream hub device 104 or memory controller 110 via the channel 106 and a downstream bus interface for communicating with a downstream hub device 104 via the channel 106.

Although only a single memory channel 106 is shown in FIG. 1 connecting the memory controller 110 to a single memory device hub 104, systems produced with these modules may include more than one discrete memory channel from the memory controller, with each of the memory channels operated singly (when a single channel is populated with modules) or in parallel (when two or more channels are populated with modules) to achieve the desired system functionality and/or performance. Moreover, any number of lanes can be included in the channel 106. For example, the downstream bus 116 can include 13 bit lanes, 2 spare lanes and a clock lane, while the upstream bus 118 may include 20 bit lanes, 2 spare lanes and a clock lane.

An exemplary embodiment of the downstream CRC is selected selected/applied such that 8, 12 and 16 transfer frames are supported (in an exemplary embodiment, 12 bitlanes are included in each transfer). The downstream CRC detects any lane failure, any transfer failure, and up to 5 bit random errors. In addition, if a downstream CRC error is detected, contents of the downstream frame are ignored and a failure information register (FIR) bit is set. The FIR is an architected means of storing information about a failure that is detected within the hub chip. The FIR can be interrogated by the memory controller and/or system to determine what action, if any, needs to be performed. In response to the FIR bit being set, an error recovery state can be entered if the system is enabled to do so. A "conventional" location for check bits is at the beginning or the end of codeword. An exemplary embodiment of the downstream code is designed so that the check bit positions are in a "non-conventional" location. This non-conventional location is desirable because of issues related to how the protocol is designed. In addition, putting the checkbits in a conventional place and them moving them around can break important properties of the code (e.g., all lane fail detect, etc.). Furthermore not all locations are feasible to provide CRC detection. Thus, the exemplary CRC code and its placement in the downstream and upstream frames are unique, non-trivial aspects of exemplary embodiments of the present invention. The non-conventional location of the check bit positions are exploited by an exemplary downstream packet format described herein.

The upstream CRC is selected/applied such that up to 20 bitlanes are covered for up to 8 transfers, and so that it detects any lane failure, any transfer failure (with an escape rate of $2^{**}(-16)$), and up to 4 random errors. In addition, all upstream hubs monitor upstream CRC data as it passes through the hub to detect upstream CRC errors, and any detected error results in that hub device interrupting all read traffic, forwarding a poisoned CRC, setting a FIR bit, and entering error recovery state.

Another feature of exemplary embodiments is the unique CRC poison technique, which is robust against additional fails. The hub device poisons its upstream CRC by interrupting any and all upstream data in progress and driving a known bad pattern onto its upstream outputs. The poisoned CRC pattern consists of all '0's in all bit positions except for a single '1' per 4 transfer block. The '1' bit alternates between lane 0 transfer 0 and lane 19 transfer 3 on every other transmitted data block. If the receivers in the upstream memory controller or hub device are expecting a read data frame, the poisoned CRC across two blocks will be seen as a 2 bit error in different transfers, in different lanes and physically as far apart as possible. If an additional bit error occurs in the poisoned CRC frame the code still guarantees detection of the invalid CRC. If there is a double bit error, the only valid CRC decode results if the double bit error inverts precisely the two bits that are '1's for the poisoning. Any other double bit error results in either a 3 bit error or a 4 bit error, which results in an invalid CRC, as desired. Even an additional lane failure anywhere, cannot result in a valid CRC. If the receivers in the upstream memory controller or hub device are expecting idle frames, there will be a single bit error received on each and every idle block. If an additional bit error occurs in the poisoned block the only valid decode results if the '1' bit was inverted. In this case, the next block (and all subsequent blocks) will contain poison to be detected. Due to the alternating '1' bit, even an additional lane failure anywhere cannot result in valid idle decode over multiple blocks.

Exemplary embodiments of the present invention provide detection coverage dimensions that are not available in any other known CRC scheme.

In an exemplary embodiment, the downstream CRC code is utilized on a 13 lane×16 beat (maximum) frame format. This CRC code can detect: any lane failure, any transfer failure, and up to 5 bit random errors. Also, among other things, the random silent error rate is about two to the power of negative seventeen ($\sim 2^{**}(-17)$).

An exemplary embodiment of the CRC polynomial is: $g(x)=1+x+x^3+x^4+x^5+x^8+x^{12}+x^{13}+x^{15}+x^{16}+x^{17}+x^{18}$. This is a Bose Chaudhuri Hocquenghem (BCH) code that has five consecutive zeros (among other zeros). This exemplary code has a minimum distance of six. The base code actually only requires 17 bits so an additional bit has been added artificially to give the appropriate length.

Figure 2:
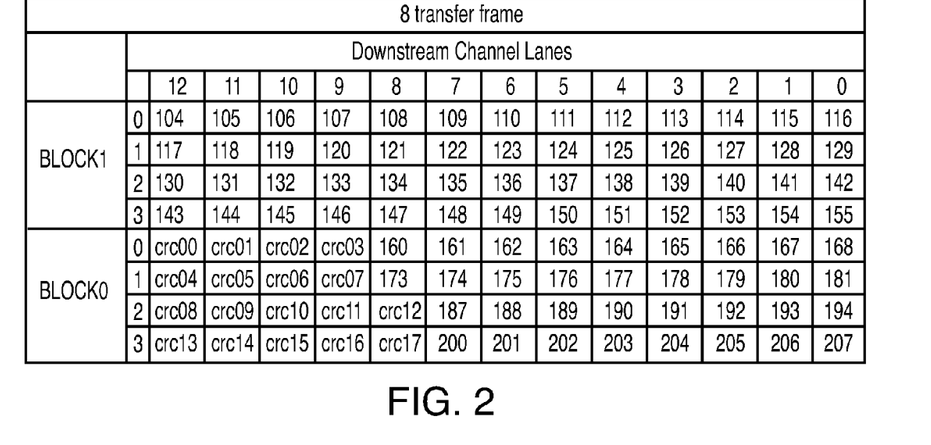
FIG. 2 depicts an exemplary downstream eight transfer frame that utilizes an embodiment of the channel CRC.
Figure 3:
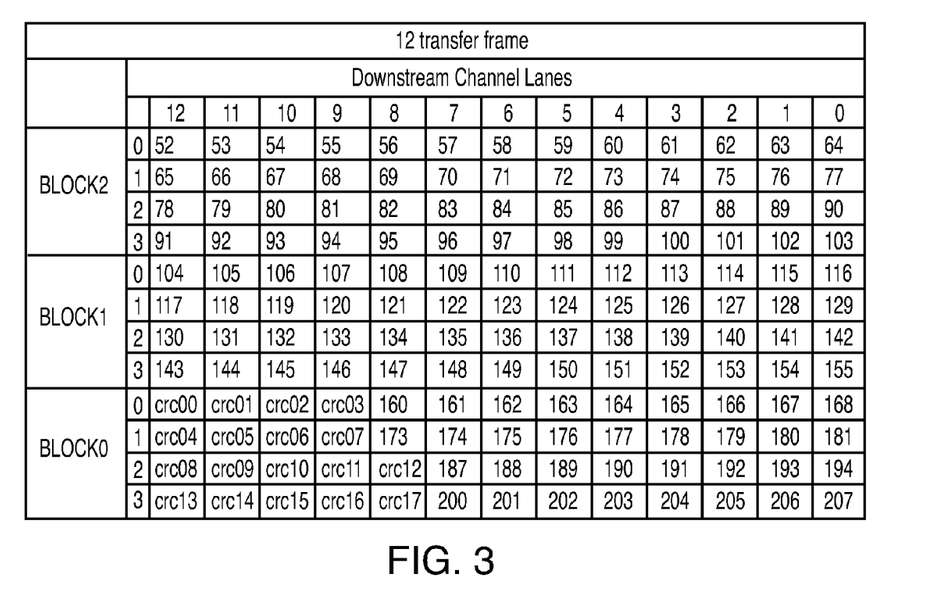
FIG. 3 depicts an exemplary downstream twelve transfer frame that utilizes an embodiment of the channel CRC.
Figure 4:
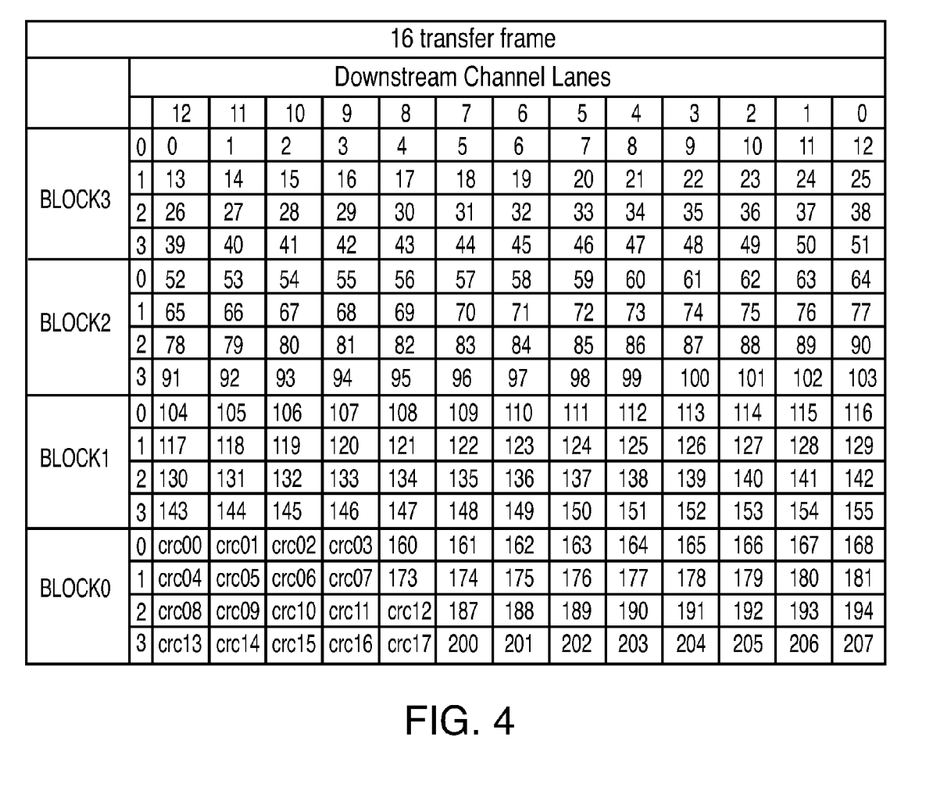
FIG. 4 depicts an exemplary downstream sixteen transfer frame that utilizes an embodiment of the channel CRC.

FIG. 2 depicts an exemplary downstream eight transfer frame that utilizes an embodiment of the channel CRC described herein. FIG. 3 depicts an exemplary downstream twelve transfer frame that utilizes an embodiment of the channel CRC described herein. Similarly, FIG. 4 depicts an exemplary downstream sixteen transfer frame that utilizes an embodiment of the channel CRC described herein. As depicted in FIGS. 2-4, the CRC bit positions are: 156, 157, 158, 159, 169, 170, 171, 172, 182, 183, 184, 185, 186, 195, 196, 197, 198, and 199. After computing a generic parity check, matrix Gaussian elimination was used to obtain a matrix suitable for calculating the CRC bits in the positions given above. While a standard shift-register implementation can be used for both encoding and decoding the CRC, for high-speed buses, a parallel approach with exclusive ORs is the recommended approach. In order for the CRC logic to be reused, the CRC is defined for the longest frame size, which is 208 bits for the 16 transfer frame. Any frame that does not use all 208 bits simply sets all unused bits to zero.

Exemplary CRC18 generation equations. The following equations may be used for a parallel encode/decode implementation. These equations are intended to be examples, other equations may also be implemented by exemplary embodiments of the present invention. Positive active CRC bits are used in the equations below. Downstream frames of all 0's will not be decoded as an error. Memory channel scrambling ensures that frames that are physically made up of all zeros will, in practice, be flagged as a CRC error. The symbol "^" represents an exclusive or (XOR) operation.

crc[0]=u[0]^u[1]^u[3]^u[4]^u[5]^u[6]^u[7]^u[8]^u[9]^u[10]^u[14]^u[15]^u[17]^u[19]^u[20]^u[23]^u[24]^u[26]^u[28]^u[29]^u[31]^u[32]^u[33]^u[34]^u[37]^u[38]^u[39]^u[41]^u[42]^u[45]^u[46]^u[47]^u[50]^u[54]^u[55]^u[57]^u[61]^u[63]^u[69]^u[70]^u^u[71]^u[82]^u[83]^u[84]^u[85]^u[86]^u[93]^u[95]^u[96]^u[97]u^u[98]^u[100]^u[101]^u[103]^u[105]^u[108]^u[110]^u[113]^u[115]^u[117]^u[120]^u[124]^u[125]^u[126]^u[128]^u[130]^u[139]^u[144]^u[148]^u[149]^u[150]^u[151]^u[154]^u[155]^u[160]^u[162]^u[163]^u[165]^u[166]^u[175]^u[179]^u[188]^u[189]^u[190]^u[191]^u[192]^u[194]^u[202]^u[204]^u[206]^u[207];

crc[1]=u[2]^u[7]^u[8]^u[11]^u[12]^u[14]^u[16]^u[17]^u[22]^u[23]^u[24]^u[25]^u[26]^u[27]^u[28]^u[29]^u[31]^u[32]^u[34]^u[36]^u[39]^u[40]^u[41]^u[44]^u[45]^u[46]^u[47]^u[48]^u[49]^u[51]^u[57]^u[61]^u[62]^u[63]^u[64]^u[67]^u[70]^u[71]^u[72]^u[73]^u[78]^u[79]^u[83]^u[87]^u[89]^u[91]^u[92]^u[95]^u[96]^u[97]^u[98]^u[100]^u[101]^u[102]^u[107]^u[108]^u[110]^u[113]^u[115]^u[118]^u[120]^u[121]^u[125]^u[126]^u[127]^u[128]^u[133]^u[135]^u[136]^u[138]^u[140]^u[141]^u[143]^u[144]^u[146]^u[148]^u[152]^u[153]^u[154]^u[166]^u[167]^u[173]^u[177]^u[179]^u[181]^u[187]^u[190]^u[193]^u[201]^u[203]^u[205];

crc[2]=u[1]^u[2]^u[3]^u[4]^u[5]^u[13]^u[15]^u[19]^u[20]^u[21]^u[22]^u[23]^u[25]^u[26]^u[27]^u[28]^u[31]^u[33]^u[35]^u[37]^u[40]^u[41]^u[43]^u[44]^u[45]^u[47]u[49]^u[51]^u[52]^u[54]^u[55]^u[56]^u[57]^u[58]^u[60]^u[63]^u[68]^u[69]^u[70]^u[71]^u[72]^u[73]^u[75]^u[77]^u[78]^u[80]^u[82]^u[84]^u[86]^u[88]^u[90]^u[93]^u[94]^u[95]^u[96]^u[100]^u[103]^u[105]^u[110]^u[111]^u[114]^u[118]^u[119]^u[123]^u[128]^u[129]^u[134]^u[135]^u[136]^u[137]^u[138]^u[139]^u[142]^u[143]^u[145]^u[146]^u[148]^u[149]^u[154]^u[162]^u[164]^u[165]^u[167]^u[168]^u[173]^u[174]^u[175]^u[176]^u[180]^u[188]^u[190]^u[191]^u[200]^u[201]^u[202]^u[203]^u[204]^u[205]^u[206];

crc[3]=u[0]^u[2]^u[3]^u[4]^u[5]^u[6]^u[7]^u[8]^u[9]^u[13]^u[14]^u[16]^u[18]^u[19]^u[22]^u[23]^u[25]^u[27]^u[28]^u[30]^u[31]^u[32]^u[33]^u[36]^u[37]^u[38]^u[40]^u[41]^u[44]^u[45]^u[46]^u[49]^u[53]^u[54]^u[56]^u[60]^u[62]^u[68]^u[69]^u[70]^u[81]^u[82]^u[83]^u[84]^u[85]^u[92]^u[94]^u[95]^u[96]^u[97]^u[99]^u[100]^u[102]^u[104]^u[107]^u[109]^u[112]^u[114]^u[116]^u[119]^u[123]^u[124]^u[125]^u[127]^u[129]^u[138]^u[143]^u[147]^u[148]^u[149]^u[150]^u[153]^u[154]^u[155]^u[161]^u[162]^u[164]^u[165]^u[174]^u[178]^u[187]^u[188]^u[189]^u[190]^u[191]^u[193]^u[201]^u[203]^u[205]^u[206];

crc[4]=u[0]^u[7]^u[8]^u[9]^u[13]^u[18]^u[19]^u[20]^u[21]^u[24]^u[25]^u[26]^u[29]^u[30]^u[31]^u[33]^u[34]^u[37]^u[40]^u[42]^u[48]^u[49]^u[50]^u[52]^u[54]^u[55]^u[57]^u[58]^u[59]^u[60]^u[61]^u[62]^u[64]^u[68]^u[71]^u[72]^u[73]^u[74]^u[76]^u[78]^u[79]^u[82]^u[84]^u[87]^u[89]^u[91]^u[92]^u[99]^u[100]^u[101]^u[102]^u[106]^u[107]^u[109]^u[111]^u[114]^u[115]^u[116]^u[120]^u[123]^u[125]^u[127]^u[130]^u[135]^u[136]^u[137]^u[139]^u[140]^u[144]^u[146]^u[148]^u[153]^u[154]^u[161]^u[162]^u[163]^u[164]^u[166]^u[168]^u[175]^u[176]^u[177]^u[178]^u[181]^u[187]^u[188]^u[190]^u[192]^u[193]^u[202]^u[204]^[207];

crc[5]=u[2]^u[4]^u[5]^u[7]^u[8]^u[9]^u[10]^u[12]^u[13]^u[14]^u[17]^u[19]^u[20]^u[21]^u[27]^u[30]^u[31]^u[33]^u[35]^u[37]^u[38]^u[40]^u[41]^u[44]^u[46]^u[50]^u[52]^u[53]^u[55]^u[60]^u[62]^u[63]^u[68]^u[70]^u[71]^u[74]^u[76]^u[79]^u[80]^u[83]^u[84]^u[85]^u[86]^u[87]^u[88]^u[89]^u[90]^u[91]^u[92]^u[93]^u[94]^u[95]^u[97]^u[98]^u[100]^u[101]^u[102]^u[103]^u[105]^u[106]^u[111]^u[112]^u[114]^u[116]^u[117]^u[118]^u[120]^u[122]^u[124]^u[125]^u[128]^u[130]^u[131]^u[139]^u[143]^u[145]^u[149]^u[161]^u[162]^u[164]^u[166]^u[167]^u[168]^u[173]^u[176]^u[178]^u[179]^u[181]^u[187]^u[189]^u[191]^u[192]^u[200]^u[201]^u[202]^u[204]^u[207];

crc[6]=u[1]^u[2]^u[3]^u[4]^u[6]^u[7]^u[8]^u[9]^u[10]^u[11]^u[12]^u[14]^u[15]^u[17]^u[18]^u[20]^u[21]^u[25]^u[26]^u[28]^u[31]^u[33]^u[36]^u[37]^u[38]^u[39]^u[40]^u[41]^u[42]^u[43]^u[44]^u[45]^u[46]^u[47]^u[49]^u[52]^u[53]^u[54]^u[58]^u[59]^u[63]^u[64]^u[65]^u[68]^u[70]^u[73]^u[76]^u[80]^u[81]^u[85]^u[88]^u[90]^u[92]^u[93]^u[96]^u[97]^u[99]^u[101]^u[102]^u[103]^u[104]^u[105]^u[108]^u[110]^u[111]^u[112]^u[113]^u[114]^u[117]^u[119]^u[120]^u[122]^u[123]^u[129]^u[130]^u[131]^u[132]^u[136]^u[137]^u[138]^u[139]^u[141]^u[143]^u[144]^u[146]^u[147]^u[150]^u[154]^u[155]^u[161]^u[162]^u[166]^u[167]^u[173]^u[174]^u[179]^u[180]^u[181]^u[187]^u[190]^u[194]^u[200]^u[204]^u[207];

crc[7]=u[0]^u[3]^u[4]^u[5]^u[6]^u[7]^u[9]^u[11]^u[12]^u[13]^u[14]^u[16]^u[18]^u[21]^u[22]^u[23]^u[24]^u[27]^u[28]^u[33]^u[34]^u[35]^u[36]^u[37]^u[39]^u[40]^u[42]^u[43]^u[44]^u[47]^u[49]^u[51]^u[53]^u[55]^u[58]^u[59]^u[61]^u[62]^u[63]^u[66]^u[67]^u[70]^u[71]^u[73]^u[75]^u[81]^u[84]^u[85]^u[86]^u[93]^u[94]^u[100]^u[101]^u[103]^u[107]^u[109]^u[112]^u[122]^u[124]^u[126]^u[127]^u[128]^u[129]^u[130]^u[132]^u[136]^u[137]^u[138]^u[139]^u[140]^u[142]^u[144]^u[148]^u[149]^u[150]^u[154]^u[155]^u[161]^u[165]^u[167]^u[168]^u[174]^u[177]^u[178]^u[179]^u[187]^u[188]^u[189]^u[190]^u[192]^u[194]^u[200]^u[201]^u[203]^u[207];

crc[8]=u[0]^u[1]^u[2]^u[4]^u[5]^u[8]^u[9]^u[12]^u[17]^u[18]^u[19]^u[20]^u[21]^u[22]^u[24]^u[29]^u[30]^u[31]^u[32]^u[42]^u[43]^u[44]^u[46]^u[48]^u[50]^u[51]^u[54]^u[55]^u[56]^u[57]^u[60]^u[62]^u[64]^u[65]^u[69]^u[70]^u[74]^u[75]^u[77]^u[78]^u[79]^u[82]^u[86]^u[92]^u[94]^u[95]^u[97]^u[98]^u[99]^u[100]^u[101]^u[102]^u[105]^u[108]^u[109]^u[110]^u[116]^u[118]^u[121]^u[122]^u[123]^u[126]^u[127]^u[135]^u[138]^u[141]^u[143]^u[144]^u[146]^u[147]^u[148]^u[153]^u[155]^u[162]^u[164]^u[165]^u[173]^u[175]^u[176]^u[178]^u[190]^u[194]^u[200]^u[201]^u[203]^u[205];

crc[9]=u[2]^u[3]^u[4]^u[12]^u[13]^u[14]^u[15]^u[17]^u[19]^u[25]^u[26]^u[28]^u[32]^u[35]^u[36]^u[38]^u[41]^u[42]^u[47]^u[51]^u[52]^u[65]^u[66]^u[67]^u[70]^u[71]^u[73]^u[75]^u[76]^u[80]^u[83]^u[84]^u[85]^u[86]^u[87]^u[89]^u[91]^u[92]^u[93]^u[94]^u[96]^u[98]^u[101]^u[102]^u[103]^u[104]^u[107]^u[108]^u[113]^u[114]^u[115]^u[116]^u[117]^u[119]^u[120]^u[122]^u[123]^u[124]^u[127]^u[129]^u[131]^u[133]^u[135]^u[138]^u[139]^u[141]^u[142]^u[143]^u[146]^u[147]^u[150]^u[151]^u[153]^u[155]^u[161]^u[164]^u[165]^u[166]^u[173]^u[174]^u[180]^u[181]^u[187]^u[189]^u[192]^u[202]^u[204]^u[206]^u[207];

crc[10]=u[0]^u[2]^u[4]^u[5]^u[6]^u[7]^u[10]^u[12]^u[13]^u[16]^u[20]^u[21]^u[22]^u[23]^u[27]^u[28]^u[29]^u[30]^u[34]^u[36]^u[38]^u[41]^u[42]^u[44]^u[45]^u[47]^u[51]^u[52]^u[53]^u[56]^u[60]^u[61]^u[62]^u[63]^u[64]^u[65]^u[66]^u[67]^u[68]^u[72]^u[75]^u[76]^u[78]^u[79]^u[81]^u[83]^u[86]^u[87]^u[88]^u[90]^u[95]^u[96]^u[97]^u[104]^u[105]^u[108]^u[113]^u[114]^u[122]^u[127]^u[132]^u[134]^u[135]^u[136]^u[138]^u[140]^u[141]^u[142]^u[144]^u[146]^u

[148]^u[149]^u[150]^u[152]^u[153]^u[160]^u[162]^u[163]^u[164]^u[165]^u[167]^u[173]^u[174]^u[175]^u[176]^u[178]^u[179]^u[181]^u[189]^u[190]^u[191]^u[192]^u[193]^u[200]^u[201]^u[202]^u[204]^u[206];

crc[11]=u[0]^u[2]^u[3]^u[4]^u[6]^u[7]^u[9]^u[11]^u[12]^u[13]^u[14]^u[18]^u[19]^u[20]^u[23]^u[28]^u[32]^u[35]^u[37]^u[39]^u[44]^u[45]^u[50]^u[51]^u[52]^u[53]^u[55]^u[56]^u[60]^u[61]^u[63]^u[66]^u[67]^u[68]^u[70]^u[73]^u[74]^u[75]^u[76]^u[78]^u[80]^u[84]^u[86]^u[87]^u[88]^u[89]^u[91]^u[92]^u[94]^u[95]^u[96]^u[99]^u[100]^u[101]^u[102]^u[106]^u[108]^u[110]^u[114]^u[115]^u[116]^u[118]^u[121]^u[122]^u[126]^u[127]^u[128]^u[133]^u[136]^u[137]^u[138]^u[139]^u[142]^u[144]^u[145]^u[146]^u[148]^u[149]^u[150]^u[151]^u[154]^u[155]^u[161]^u[162]^u[163]^u[166]^u[168]^u[173]^u[174]^u[177]^u[178]^u[179]^u[180]^u[191]^u[192]^u[193]^u[200]^u[202]^u[207];

crc[12]=u[6]^u[7]^u[8]^u[12]^u[17]^u[18]^u[19]^u[20]^u[23]^u[24]^u[25]^u[28]^u[29]^u[30]^u[32]^u[33]^u[36]^u[39]^u[41]^u[47]^u[48]^u[49]^u[51]^u[53]^u[54]^u[56]^u[57]^u[58]^u[59]^u[60]^u[61]^u[63]^u[67]^u[70]^u[71]^u[72]^u[73]^u[75]^u[77]^u[78]^u[81]^u[83]^u[86]^u[88]^u[90]^u[91]^u[98]^u[99]^u[100]^u[101]^u[105]^u[106]^u[108]^u[110]^u[113]^u[114]^u[115]^u[119]^u[122]^u[124]^u[126]^u[129]^u[134]^u[135]^u[136]^u[138]^u[139]^u[143]^u[145]^u[147]^u[152]^u[153]^u[160]^u[161]^u[162]^u[163]^u[165]^u[167]^u[168]^u[174]^u[175]^u[176]^u[177]^u[180]^u[187]^u[189]^u[191]^u[192]^u[201]^u[203]^u[206];

crc[13]=u[3]^u[7]^u[8]^u[12]^u[18]^u[19]^u[21]^u[22]^u[24]^u[29]^u[30]^u[32]^u[34]^u[35]^u[36]^u[37]^u[39]^u[43]^u[44]^u[46]^u[47]^u[49]^u[50]^u[54]^u[56]^u[58]^u[67]^u[69]^u[70]^u[71]^u[73]^u[78]^u[79]^u[82]^u[83]^u[89]^u[91]^u[92]^u[93]^u[94]^u[96]^u[97]^u[98]^u[99]^u[101]^u[103]^u[104]^u[105]^u[106]^u[107]^u[109]^u[111]^u[114]^u[116]^u[117]^u[124]^u[125]^u[126]^u[129]^u[130]^u[131]^u[133]^u[135]^u[136]^u[138]^u[139]^u[141]^u[143]^u[145]^u[146]^u[153]^u[160]^u[161]^u[162]^u[164]^u[165]^u[166]^u[173]^u[175]^u[176]^u[177]^u[180]^u[181]^u[187]^u[188]^u[190]^u[194]^u[201]^u[202]^u[204]^u[206];

crc[14]=u[1]^u[2]^u[3]^u[5]^u[7]^u[8]^u[13]^u[17]^u[19]^u[22]^u[23]^u[25]^u[30]^u[33]^u[34]^u[38]^u[39]^u[40]^u[42]^u[44]^u[45]^u[49]^u[50]^u[58]^u[59]^u[60]^u[62]^u[64]^u[65]^u[67]^u[68]^u[70]^u[72]^u[73]^u[75]^u[77]^u[79]^u[80]^u[84]^u[86]^u[89]^u[90]^u[91]^u[92]^u[94]^u[96]^u[97]^u[98]^u[99]^u[103]^u^u^u[105]^u[111]^u[112]^u[114]^u[115]^u[121]^u[122]^^u[124]^u[126]^u[129]^u[132]^u[133]^u[134]^u[137]^u[140]^u[142]^u[145]^u[146]^u[148]^u[154]^u[155]^u[160]^u[162]^u[163]^u[165]^u[167]^u[174]^u[176]^u[180]^u[187]^u[189]^u[191]^u[200]^u[204]^u[206]^u[207];

crc[15]=u[0]^u[1]^u[2]^u[5]^u[7]^u[10]^u[15]^u[17]^u[18]^u[19]^u[28]^u[29]^u[32]^u[33]^u[35]^u[37]^u[38]^u[40]^u[42]^u[43]u[47]^u[51]^u[54]^u[55]^u[57]^u[59]^u[60]^u[65]^u[66]^u[68]^u[70]^u[73]^u[74]^u[76]^u[78]^u[80]^u[81]^u[82]^u[83]^u[84]^u[86]^u[87]^u[90]^u[91]^u[92]^u[96]^u[99]^u[101]^u[103]^u[104]^u[105]^u[106]^u[108]^u[110]^u[112]^u[116]^u[117]^u[120]^u[122]^u[123]^u[126]^u[127]^u[128]^u[133]^u[134]^u[135]^u[138]^u[139]^u[141]^u[143]^u[144]^u[146]^u[147]^u[148]^u[150]^u[151]^u[154]^u[160]^u[161]^u[162]^u[164]^u[165]^u[168]^u[177]^u[179]^u[181]^u[189]^u[191]^u[194]^u[201]^u[202]^u[204]^u[205]^u[206];

crc[16]=u[0]^u[4]^u[5]^u[6]^u[11]^u[13]^u[16]^u[17]^u[20]^u[21]^u[24]^u[25]^u[26]^u[34]^u[35]^u[38]^u[40]^u[41]^u[43]^u[44]^u[47]^u[48]^u[50]^u[51]^u[54]^u[55]^u[56]^u[58]^u[59]^u[60]^u[65]^u[66]^u[68]^u[69]^u[71]^u[72]^u[74]^u[76]^u[78]^u[81]^u[85]^u[86]^u[88]^u[91]^u[95]^u[96]^u[97]^u[99]^u[100]^u[101]^u[102]^u[103]^u[105]^u[106]^u[107]^u[108]^u[110]^u[111]^u[113]^u[115]^u[116]^u[120]^u[122]^u[123]^u[127]^u[128]^u[131]^u[133]^u[134]^u[136]^u[137]^u[139]^u[142]^u[144]^u[146]^u[148]^u[149]^u[151]^u[152]^u[153]^u[154]^u[160]^u[161]^u[164]^u[165]^u[166]^u[168]^u[175]^u[176]^u[178]^u[193]^u[200]^u[202]; and crc[17]=u[1]^u[5]^u[6]^u[8]^u[9]^u[12]^u[13]^u[14]^u[17]^u[19]^u[20]^u[22]^u[24]^u[27]^u[29]^u[30]^u[31]^u[33]^u[34]^u[35]^u[36]^u[37]^u[39]^u[40]^u[41]^u[44]^u[45]^u[50]^u[51]^u[54]^u[56]^u[58]^u[62]^u[64]^u[66]^u[67]^u[68]^u[69]^u[70]^u[71]^u[74]^u[75]^u[76]^u[77]^u^u[84]^u[86]^u[91]^u[96]^u[97]^u[98]^u[99]^u[103]^u[104]^u[108]^u[112]^u[115]^u[117]^u[120]^u[121]^u[124]^u[125]^u[127]^u[128]^u[129]^u[130]^u[132]^u[134]^u[136]^u[138]^u[139]^u[143]^u[144]^u[145]^u[146]^u[147]^u[148]^u[149]^u[150]^u[152]^u[155]^u[163]^u[164]^u[165]^u[167]^u[168]^u[175]^u[178]^u[179]^u[181]^u[187]^u[188]^u[190]^u[192]^u[193]^u[194]^u[201]^u[202]^u[203]^u[204]^u[207].

The basic CRC algorithm is to encode the CRC checkbits as defined above and to transmit them across the bus per the frame protocol. After the data is received by the checker on the other end of the bus (e.g., in a hub deivce), a new or regenerated set of CRC checkbits is computed. The received CRC checkbits and the regenerated CRC checkbits are then compared (XOR'd) to form the syndrome vector. If the syndrome is a bitwise 0 vector, then no error is assumed to have occurred in the transmission of the data. Any non-zero syndrome indicates an error has occurred. This implementation, as with most CRC's, does not support direct error isolation by examination of the syndrome. When the hub device detects a downstream CRC error it ignores all contents of the downstream frame, sets the appropriate FIR bit, poisons, and forwards the faulty CRC and, if enabled, enters the error recovery state.

Figure 5:
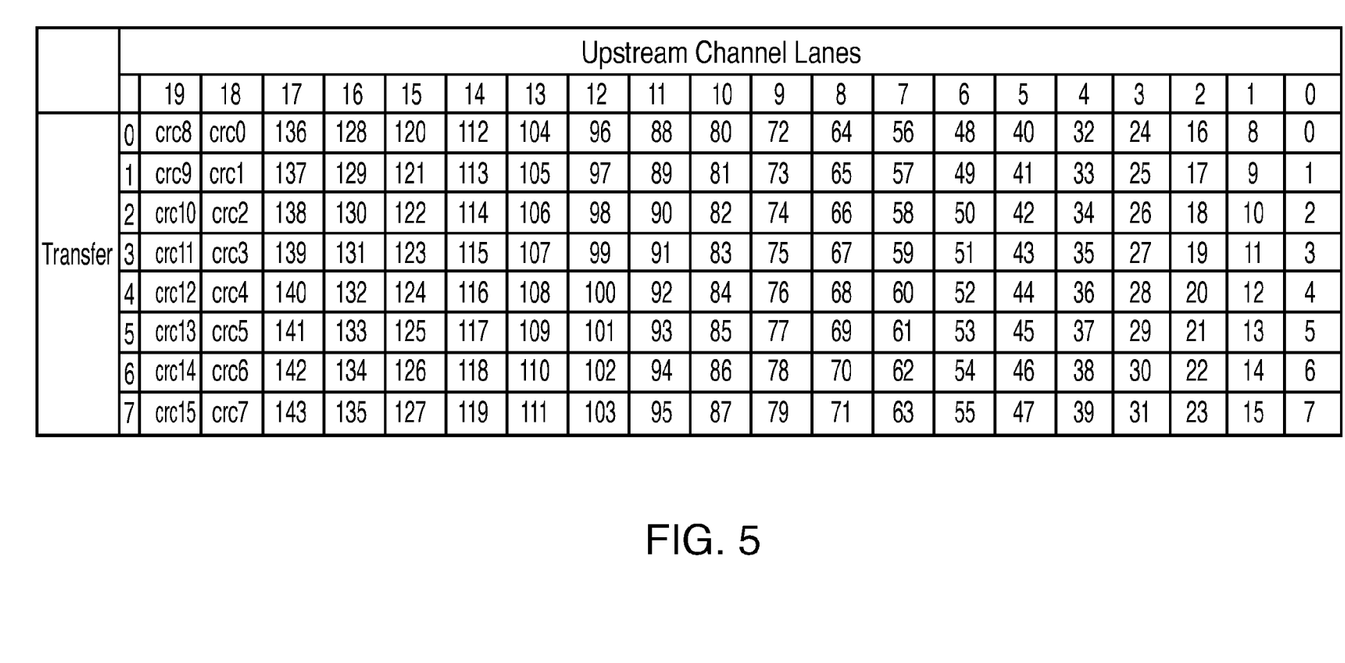
FIG. 5 depicts an exemplary upstream eight transfer frame that utilizes an embodiment of the channel CRC.

FIG. 5 depicts an exemplary upstream 8 transfer frame that utilizes an embodiment of the channel CRC described herein. The upstream CRC is described as follows for an 8 transfer frame format along with its CRC and error checking bit numbers. This code is intended for use on a 20 lane×8 beat frame format. It can detect any lane failure, any transfer failure (transfer failures escape from the code with a probability 2**(−16)), and up to 4 bit random errors.

The CRC polynomial: $g(x)=1+x+x^2+x^5+x^7+x^8+x^9+x^{10}+x^{11}+x^{15}+x^{16}$. This is a BCH code that has four consecutive zeros (among other zeros). Therefore, it has a minimum distance 5. The polynomial for the code for the downstream format was obtained by multiplying the code for the upstream format by $1+x^2$. The CRC bit positions as depicted in FIG. 5 are 144, 145, 146, 147, 148, 149, 150, 151, 152, 153, 154, 155, 156, 157, 158, and 159.

Exemplary CRC16 generation equations follow. These equations are examples, and other equations may also be implemented by exemplary embodiments.

crc[0]=u[0]^u[2]^u[3]^u[4]^u[7]^u[10]^u[14]^u[17]^u[21]^u[23]^u[24]^u[26]^u[32]^u[35]^u[38]^u[41]^u[42]^u[45]^u[46]^u[47]^u[52]^u[55]^u[56]^u[57]^u[62]^u[64]^u[65]^u[67]^u[69]^u[72]^u[74]^u[77]^u[80]^u[81]^u[83]^u[84]^u[85]^u[86]^u[89]^u[94]^u[98]^u[99]^u[101]^u[102]^u[104]^u[105]^u[109]^u[110]^u[113]^u[114]^u[116]^u[117]^u[119]^u[121]^u[122]^u[123]^u[124]^u[125]^u[126]^u[128]^u[129]^u[130]^u[132]^u[135]^u[136]^u[137]^u[138]^u[139]^u[140]^u[141]^u[143];

crc[1]=u[1]^u[2]^u[5]^u[7]^u[8]^u[10]^u[11]^u[14]^u[15]^u[17]^u[18]^u[21]^u[22]^u[23]^u[25]^u[26]^u[27]^u[32]^u[33]^u[35]^u[36]^u[38]^u[39]^u[41]^u[43]^u[45]^u[48]^u[52]^u[53]^u[55]^u[58]^u[62]^u[63]^u[64]^u[66]^u[67]^u[68]^u[69]^u[70]^u[72]^u[73]^u[74]^u[75]^u[77]^u[78]^u

[80]^u[82]^u[83]^u[87]^u[89]^u[90]^u[94]^u[95]^u[98]^u[100]^u[101]^u[103]^u[104]^u[106]^u[109]^u[111]^u[113]^u[115]^u[116]^u[118]^u[119]^u[120]^u[121]^u[127]^u[128]^u[131]^u[132]^u[133]^u[135]^u[142]^u[143];

crc[2]=u[0]^u[4]^u[6]^u[7]^u[8]^u[9]^u[10]^u[11]^u[12]^u[14]^u[15]^u[16]^u[17]^u[18]^u[19]^u[21]^u[22]^u[27]^u[28]^u[32]^u[33]^u[34]^u[35]^u[36]^u[37]^u[38]^u[39]^u[40]^u[41]^u[44]^u[45]^u[45]^u[47]^u[49]^u[52]^u[53]^u[54]^u[55]^u[57]^u[59]^u^u[62]^u[63]^u[68]^u[70]^u[71]^u[72]^u[73]^u[75]^u[76]^u[77]^u[78]^u[79]^u[80]^u[85]^u[86]^u[88]^u[89]^u[90]^u[91]^u[94]^u[95]^u[96]^u[98]^u[107]^u[109]^u[112]^u[113]^u[120]^u[123]^u[124]^u[125]^u[126]^u[130]^u[133]^u[134]^u[135]^u[137]^u[138]^u[139]^u[140]^u[141];

crc[3]=u[0]^u[1]^u[5]^u[7]^u[8]^u[9]^u[10]^u[11]^u[12]^u[13]^u[15]^u[16]^u[17]^u[18]^u[19]^u[20]^u[22]^u[23]^u[28]^u[29]^u[33]^u[34]^u[35]^u[36]^u[37]^u[38]^u[39]^u[40]^u[41]^u[42]^u[45]^u[46]^u[48]^u[50]^u[53]^u[54]^u[55]^u[56]^u[58]^u[60]^u[63]^u[64]^u[69]^u[71]^u[72]^u[73]^u[74]^u[76]^u[77]^u[78]^u[79]^u[80]^u[81]^u[86]^u[87]^u[89]^u[90]^u[91]^u[92]^u[95]^u[96]^u[97]^u[99]^u[108]^u[110]^u[113]^u[114]^u[121]^u[124]^u[125]^u[126]^u[127]^u[131]^u[134]^u[135]^u[136]^u[138]^u[139]^u[140]^u[141]^u[142];

crc[4]=u[0]^u[1]^u[2]^u[6]^u[8]^u[9]^u[10]^u[11]^u[12]^u[13]^u[14]^u[16]^u[17]^u[18]^u[19]^u[20]^u[21]^u[23]^u[24]^u[29]^u[30]^u[34]^u[35]^u[36]^u[37]^u[38]^u[39]^u[40]^u[41]^u[42]^u[43]^u[46]^u[47]^u[49]^u[51]^u[54]^u[55]^u[56]^u[57]^u[59]^u[61]^u[64]^u[65]^u[70]^u[72]^u[73]^u[74]^u[75]^u[77]^u[78]^u[79]^u[80]^u[81]^u[82]^u[87]^u[88]^u[90]^u[91]^u[92]^u[93]^u[96]^u[97]^u[98]^u[100]^u[109]^u[111]^u[114]^u[115]^u[122]^u[125]^u[126]^u[127]^u[128]^u[132]^u[135]^u[136]^u[137]^u[139]^u[140]^u[141]^u[142]^u[143];

crc[5]=u[1]^u[4]^u[9]^u[11]^u[12]^u[13]^u[14]^u[15]^u[18]^u[19]^u[20]^u[22]^u[23]^u[25]^u[26]^u[30]^u[31]^u[32]^u[36]^u[37]^u[39]^u[40]^u[43]^u[44]^u[45]^u[46]^u[48]^u[50]^u[58]^u[60]^u[64]^u[66]^u[67]^u[69]^u[71]^u[72]^u[73]^u[75]^u[76]^u[77]^u[78]^u[79]^u[82]^u[84]^u[85]^u[86]^u[88]^u[91]^u[92]^u[93]^u[97]^u[102]^u[104]^u[105]^u[109]^u[112]^u[113]^u[114]^u[115]^u[117]^u[119]^u[121]^u[122]^u[124]^u[125]^u[127]^u[130]^u[132]^u[133]^u[135]^u[139]^u[142];

crc[6]=u[2]^u[5]^u[10]^u[12]^u[14]^u[16]^u[19]^u[20]^u[21]^u[23]^u[24]^u[26]^u[27]^u[31]^u[32]^u[33]^u[37]^u[38]^u[40]^u[41]^u[44]^u[45]^u[46]^u[47]^u[49]^u[51]^u[59]^u[61]^u[65]^u[67]^u[68]^u[70]^u[72]^u[73]^u[74]^u[76]^u[77]^u[78]^u[79]^u[80]^u[83]^u[85]^u[86]^u[87]^u[89]^u[92]^u[93]^u[94]^u[98]^u[103]^u[105]^u[106]^u[110]^u[113]^u[114]^u[115]^u[116]^u[118]^u[120]^u[122]^u[123]^u[125]^u[126]^u[128]^u[131]^u[133]^u[134]^u[136]^u[140]^u[143];

crc[7]=u[0]^u[2]^u[4]^u[6]^u[7]^u[10]^u[11]^u[13]^u[15]^u[20]^u[22]^u[23]^u[25]^u[26]^u[27]^u[28]^u[33]^u[34]^u[35]^u[39]^u[48]^u[50]^u[55]^u[56]^u[57]^u[60]^u[64]^u[65]^u[66]^u[67]^u[68]^u[71]^u[72]^u[73]^u[75]^u[78]^u[79]^u[83]^u[85]^u[87]^u[88]^u[89]^u[90]^u[93]^u[95]^u[98]^u[101]^u[102]^u[105]^u[106]^u[107]^u[109]^u[110]^u[111]^u[113]^u[115]^u[122]^u[125]^u[127]^u[128]^u[130]^u[134]^u[136]^u[138]^u[139]^u[140]^u[143];

crc[8]=u[0]^u[1]^u[2]^u[4]^u[5]^u[8]^u[10]^u[11]^u[12]^u[16]^u[17]^u[27]^u[28]^u[29]^u[32]^u[34]^u[36]^u[38]^u[40]^u[41]^u[45]^u[46]^u[47]^u[49]^u[51]^u[52]^u[55]^u[58]^u[61]^u[62]^u[64]^u[66]^u[68]^u[73]^u[76]^u[77]^u[79]^u[81]^u[83]^u[85]^u[88]^u[90]^u[91]^u[96]^u[98]^u[101]^u[103]^u[104]^u[105]^u[106]^u[107]^u[108]^u[109]^u[111]^u[112]^u[113]^u[117]^u[119]^u[121]^u[122]^u[124]^u[125]^u[130]^u[131]^u[132]^u[136]^u[138]^u[143];

crc[9]=u[1]^u[4]^u[5]^u[6]^u[7]^u[10]^u[11]^u[12]^u[13]^u[14]^u[18]^u[21]^u[23]^u[24]^u[26]^u[28]^u[29]^u[30]^u[32]^u[33]^u[37]^u[38]^u[39]^u[43]^u[45]^u[48]^u[50]^u[53]^u[55]^u[57]^u[59]^u[63]^u[64]^u[72]^u[78]^u[81]^u[82]^u[83]^u[85]^u[91]^u[92]^u[94]^u[97]^u[98]^u[101]^u[106]^u[107]^u[108]^u[112]^u[116]^u[117]^u[118]^u[119]^u[120]^u[121]^u[124]^u[128]^u[129]^u[130]^u[131]^u[133]^u[135]^u[136]^u[138]^u[140]^u[141]^u[143];

crc[10]=u[3]^u[4]^u[5]^u[6]^u[8]^u[11]^u[12]^u[12]^u[15]^u[17]^u[19]^u[21]^u[22]^u[23]^u[25]^u[26]^u[27]^u[29]^u[30]^u[31]^u[32]^u[33]^u[34]^u[35]^u[39]^u[40]^u[41]^u[42]^u[44]^u[45]^u[47]^u[49]^u[51]^u[52]^u[54]^u[55]^u[57]^u[58]^u[60]^u[62]^u[67]^u[69]^u[72]^u[73]^u[74]^u[77]^u[79]^u[80]^u[81]^u[82]^u[85]^u[89]^u[92]^u[93]^u[94]^u[95]^u[101]^u[104]^u[105]^u[107]^u[108]^u[110]^u[114]^u[116]^u[118]^u[120]^u[123]^u[124]^u[126]^u[128]^u[131]^u[134]^u[135]^u[138]^u[140]^u[142]^u[143];

crc[11]=u[0]^u[2]^u[3]^u[5]^u[6]^u[9]^u[10]^u[12]^u[13]^u[16]^u[17]^u[18]^u[20]^u[21]^u[22]^u[27]^u[28]^u[30]^u[31]^u[33]^u[34]^u[36]^u[38]^u[40]^u[43]^u[47]^u[48]^u[50]^u[53]^u[57]^u[58]^u[59]^u[61]^u[62]^u[63]^u[64]^u[65]^u[67]^u[68]^u[69]^u[70]^u[72]^u[73]^u[75]^u[77]^u[78]^u[82]^u[84]^u[85]^u[89]^u[90]^u[93]^u[95]^u[96]^u[98]^u[99]^u[101]^u[104]^u[106]^u[108]^u[110]^u[111]^u[113]^u[114]^u[115]^u[116]^u[122]^u[123]^u[126]^u[127]^u[128]^u[130]^u[137]^u[138]^u[140];

crc[12]=u[1]^u[3]^u[4]^u[6]^u[7]^u[10]^u[11]^u[13]^u[14]^u[17]^u[18]^u[19]^u[21]^u[22]^u[23]^u[28]^u[29]^u[31]^u[32]^u[34]^u[35]^u[37]^u[39]^u[41]^u[44]^u[48]^u[49]^u[51]^u[54]^u[58]^u[59]^u[60]^u[62]^u[63]^u[64]^u[65]^u[66]^u[68]^u[69]^u[70]^u[71]^u[73]^u[74]^u[76]^u[78]^u[79]^u[83]^u[85]^u[86]^u[90]^u[91]^u[94]^u[96]^u[97]^u[99]^u[100]^u[102]^u[105]^u[107]^u[109]^u[111]^u[112]^u[114]^u[115]^u[116]^u[117]^u[123]^u[124]^u[127]^u[128]^u[129]^u[131]^u[138]^u[139]^u[141];

crc[13]=u[2]^u[4]^u[5]^u[7]^u[8]^u[11]^u[12]^u[14]^u[15]^u[18]^u[19]^u[20]^u[22]^u[23]^u[24]^u[29]^u[30]^u[32]^u[33]^u[35]^u[36]^u[38]^u[40]^u[42]^u[45]^u[49]^u[50]^u[52]^u[55]^u[59]^u[60]^u[61]^u[63]^u[64]^u[65]^u[66]^u[67]^u[69]^u[70]^u[71]^u[72]^u[74]^u[75]^u[77]^u[79]^u[80]^u[84]^u[86]^u[87]^u[91]^u[92]^u[95]^u[97]^u[98]^u[100]^u[101]^u[103]^u[106]^u[108]^u[110]^u[112]^u[113]^u[115]^u[116]^u[117]^u[118]^u[124]^u[125]^u[128]^u[129]^u[130]^u[132]^u[139]^u[140]^u[142];

crc[14]=u[0]^u[3]^u[5]^u[6]^u[8]^u[9]^u[12]^u[13]^u[15]^u[16]^u[19]^u[20]^u[21]^u[23]^u[24]^u[25]^u[30]^u[31]^u[33]^u[34]^u[36]^u[37]^u[39]^u[41]^u[43]^u[46]^u[50]^u[51]^u[53]^u[56]^u[60]^u[61]^u[62]^u[64]^u[65]^u[66]^u[67]^u[68]^u[70]^u[71]^u[72]^u[73]^u[75]^u[76]^u[78]^u[80]^u[81]^u[85]^u[87]^u[88]^u[92]^u[93]^u[96]^u[98]^u[99]^u[101]^u[102]^u[104]^u[107]^u[109]^u[111]^u[113]^u[114]^u[116]^u[117]^u[118]^u[119]^u[125]^u[126]^u[129]^u[130]^u[131]^u[133]^u[140]^u[141]^u[143]; and crc[15]=u[1]^u[2]^u[3]^u[6]^u[9]^u[13]^u[16]^u[20]^u[22]^u[23]^u[25]^u[31]^u[34]^u[37]^u[40]^u[41]^u[44]^u[45]^u[46]^u[51]^u[54]^u[55]^u[56]^u[61]^u[63]^u[64]^u[66]^u[68]^u[71]^u[73]^u[76]^u[79]^u[80]^u[82]^u[83]^u[84]^u[85]^u[88]^u[93]^u[97]^u[98]^u[100]^u[101]^u[103]^u[104]^u[108]^u[109]^u[112]^u[113]^u[115]^u[116]^u[118]^u[120]^u[121]^u[122]^u[123]^u[124]^u[125]^u[127]^u[128]^u[129]^u[131]^u[134]^u[135]^u[136]^u[137]^u[138]^u[139]^u[140]^u[142]^u[143]

An exemplary CRC algorithm includes encoding the CRC checkbits as defined above and transmitting them across the bus per the frame protocol. After the data is received by the checker (e.g., in a hub device) on the other end of the bus, a new or regenerated set of CRC checkbits is computed. The received CRC checkbits and the regenerated CRC checkbits are then compared (XOR'd) to form the syndrome vector. If the syndrome is a bitwise 0 vector, then no error is assumed to have occurred in the transmission of the data. Any non-zero syndrome indicates an error has occurred. This implementation, as with most CRC's, does not support direct error isolation by examination of the syndrome.

Figure 6:
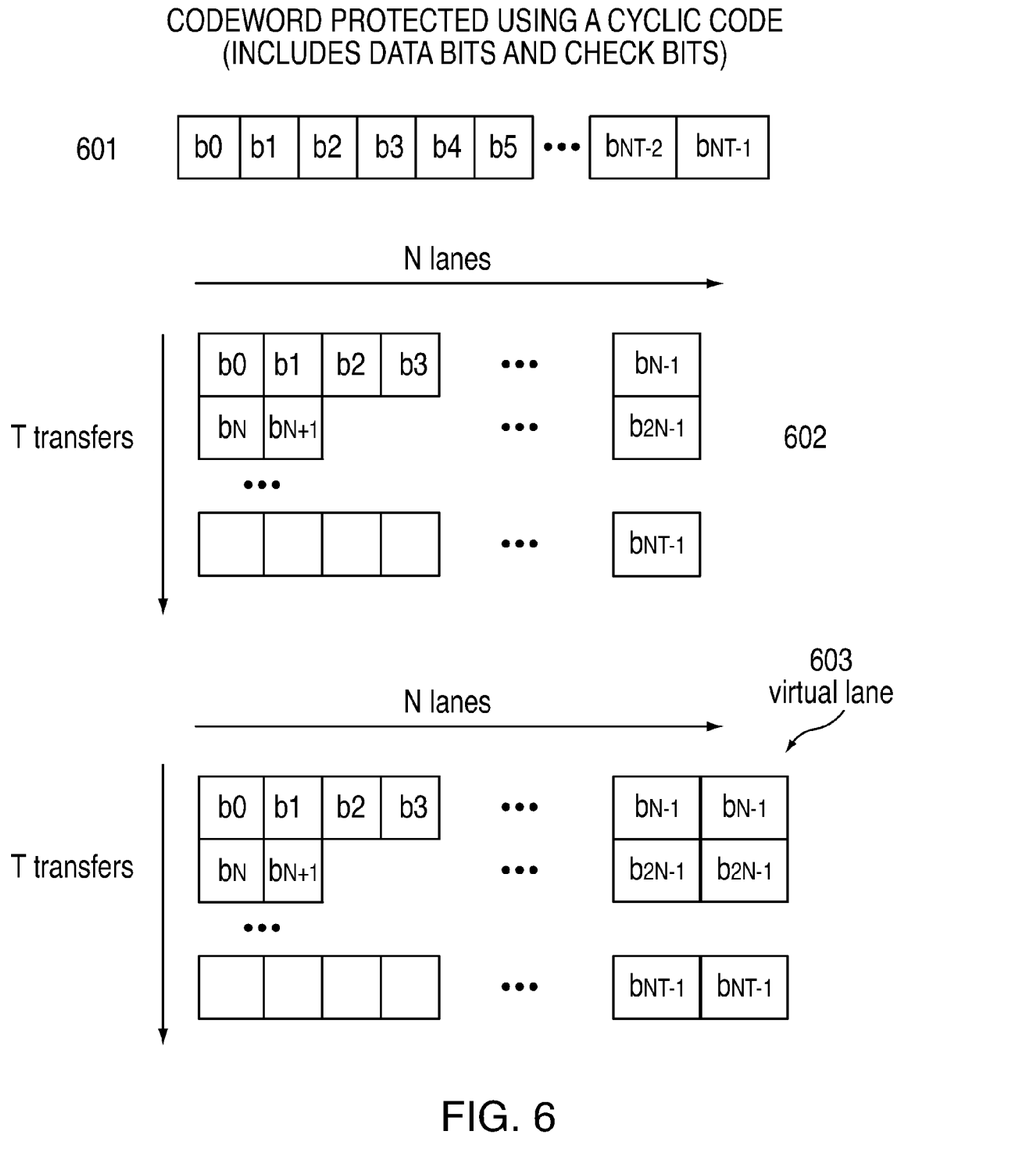
FIG. 6 depicts an exemplary methodology for finding error detection codes.

While this description has been focused on downstream and upstream frames with specific number of lanes and transfers, and error detection codes for up to a specific number of single bit errors, lane errors and potentially transfer errors, it is possible to design error detection codes for other parameters. FIG. 6 depicts an exemplary methodology for finding such error detection codes. A frame with "T" transfers and "N" lanes is assumed. In order to obtain an error detection code that is able to detect any transfer error, as well as any lane error, it is assumed that the number of check bits in the error detection code is at least the largest of T or N. The of check bits in the error detection code is referred to as "r". Data encoded with standard error detection codes is generally thought of as a sequence of symbols (in the most common case bits) arranged in a linear fashion. Error detection codes such as cyclic codes have the property that they are able to detect any error pattern that does not occupy more than r contiguous bits. Referring to FIG. 6, it can be appreciated that one bits of a codeword 601 of a cyclic error detection code may be arranged in a T×N array 602 by placing them from left to right and then top down manner (another design is to place them from top down and then left right). Due to the property alluded to earlier of cyclic error detection codes, it is guaranteed that any transfer error is detectable in this manner. It is often the case that a cyclic error detection code such as a BCH code will also have the property that any transfer error is detectable. Cyclic codes may also be designed to have a desired minimum distance, which furnishes them with their random bit error detection capability. Thus, by a proper design of the cyclic code, the property that any lane error, any transfer error and up to a certain number of random bit errors are detectable can be obtained simultaneously. When a cyclic code cannot be found satisfying these properties for given parameters T,N, other code construction techniques may be utilized. One such technique is to include additional virtual lanes beyond the number of lanes to be transmitted (illustrated in 603 for a single virtual lane). These lanes are virtual because they are not transmitted on the bus and are included just to affect the properties of the resulting error detection code. The content of a virtual lane is fixed at design time and is agreed to by both the sender and the transmitter. A typical value for the virtual lane is the all zeros lane. By adding one or more virtual lanes, the property that any transfer error is detectable may be gained or lost. Thus, from this description, general error detection codes for arbitrary parameters T,N, that can detect any lane failure, any transfer failure, and up to a certain number of random bits may be obtained. The description above can be duplicated in the case the bits are arranged from top down and then left right by adding virtual transfers as opposed to virtual lanes.

Non-last hub devices in the memory channel must monitor frames received from a downstream hub device on an upstream bus to properly detect and forward poisoned CRC. When the hub device detects an upstream CRC error it interrupts all read traffic in progress, forwards the poisoned CRC, sets the appropriate FIR bit and enters the error recovery state.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet (s) and transmitted through the memory bus(es) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refer to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including soldered interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated with the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits include providing a robust CRC for use in a high-speed serial link. They may lead to an increase in error detection on the high-speed serial link.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, it will be understood that the use of the terms first, second, etc. do not denote any order or importance, but rather the terms first, second, etc. are used to distinguish one element from another.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A cascade interconnect memory system comprising:
   a memory controller;
   a memory hub device; and
   a downstream link in communication with the memory controller and the memory hub device and comprised of at least thirteen signal lanes for transmitting a multiple transfer downstream frame from the memory controller to the memory hub device, a portion of the downstream frame including downstream cyclical redundancy code (CRC) bits to detect errors in the downstream frame, the downstream CRC bits capable of detecting any one of a lane failure, a transfer failure and up to five bit random errors,
   wherein the memory hub device ignores all contents of the downstream frame and sets a failure information register (FIR) bit in response to detecting an error.

2. The cascade interconnect memory system of claim 1 wherein the downstream frame is comprised of eight transfers.

3. The cascade interconnect memory system of claim 1 wherein the downstream frame is comprised of twelve transfers.

4. The cascade interconnect memory system of claim 1 wherein the downstream frame is comprised of sixteen transfers.

5. The cascade interconnect memory system of claim 1 wherein the downstream frame includes a first block of four transfers, the first block including downstream CRC bits 0-3 in signal lanes 12-9 respectively of transfer 0, downstream CRC bits 4-7 in signal lanes 12-9 respectively of transfer 1, downstream CRC bits 8-12 in signal lanes 12-0 respectively of transfer 2, and downstream CRC bits 13-17 in signal lanes 12-8 respectively of transfer 3.

6. The cascade interconnect memory system of claim 1 wherein the memory hub device further poisons the CRC and forwards the poisoned CRC to the memory controller in response to detecting the error.

7. The cascade interconnect memory system of claim 1 wherein the memory hub device further initiates an error recovery state in response to detecting the error.

8. The cascade interconnect memory system of claim 1 further comprising an upstream link in communication with the memory controller and the memory hub device and comprised of at least twenty signal lanes for transmitting an eight transfer upstream frame from the memory hub device to the memory controller, a portion of the upstream frame including upstream CRC bits to detect errors in the upstream frame, the upstream CRC bits capable of detecting any one of a lane failure, a transfer failure and up to four bit random errors.

9. The cascade interconnect memory system of claim 8 wherein the upstream frame includes upstream CRC bits 8-15 in signal lanes 0-7 respectively and upstream CRC bits 0-7 in signal lanes 0-7 respectively.

10. The cascade interconnect memory system of claim 1 further comprising:
    a second hub device; and
    a second downstream link in communication with the hub device and the second hub device and comprised of at least thirteen signal lanes for transmitting a second multiple transfer downstream frame from the hub device to the second hub device, a portion of the second downstream frame including second downstream CRC bits to detect errors in the second downstream frame, the second downstream CRC bits capable of detecting any one of a lane failure, a transfer failure and up to five bit random errors.

11. The cascade interconnect memory system of claim 10 wherein the second multiple transfer downstream frame includes the same contents as the multiple transfer downstream frame.

12. A cascade interconnect memory system comprising:
    a memory controller;
    a memory hub device; and
    an upstream link in communication with the memory controller and the memory hub device and comprised of at least twenty signal lanes for transmitting an eight transfer upstream frame from the memory hub device to the memory controller, a portion of the upstream frame including upstream CRC bits to detect errors in the upstream frame, the upstream CRC bits capable of detecting any one of a lane failure and up to four bit random errors,
    wherein the memory hub device ignores all contents of the upstream frame and sets a FIR bit in response to detecting an error.

13. The cascade interconnect memory system of claim 12 wherein the upstream frame includes upstream CRC bits 8-15 in signal lanes 0-7 respectively and upstream CRC bits 0-7 in signal lanes 0-7 respectively.

14. The cascade interconnect memory system of claim 12 wherein the memory hub device further poisons the CRC and forwards the poisoned CRC to the memory controller in response to detecting the error.

15. The cascade interconnect memory system of claim 12 wherein the memory controller further initiates an error recovery state in response to detecting the error.

16. The cascade interconnect memory system of claim 12 further comprising:
    a second hub device; and
    a second upstream link in communication with the hub device and the second hub device and comprised of at least twenty signal lanes for transmitting a second eight transfer upstream frame the second memory hub device to the memory hub device, a portion of the second eight transfer upstream frame including second upstream CRC bits to detect errors in the second upstream frame, the second upstream CRC bits capable of detecting any one of a lane failure, a transfer failure and up to four bit random errors.

17. The cascade interconnect memory system of claim 16 wherein the second eight transfer upstream frame includes the same contents as the eight transfer upstream frame.

18. A method for providing CRC coverage for a downstream multiple transfer frame, the method comprising selectively choosing locations for CRC bits in the downstream frame to provide coverage for any one of a lane failure, a transfer failure and up to five bit random errors.

19. The method of claim 18 wherein the downstream frame includes a first block of four transfers, the first block including downstream CRC bits 0-3 in signal lanes 12-9 respectively of transfer 0, downstream CRC bits 4-7 in signal lanes 12-9 respectively of transfer 1, downstream CRC bits 8-12 in signal lanes 12-0 respectively of transfer 2, and downstream CRC bits 13-17 in signal lanes 12-8 respectively of transfer 3.

20. A method for providing CRC coverage for a multiple transfer frame having multiple bit lanes, the method comprising generating a CRC with at least the largest of T and N checkbits, such that the CRC detects any transfer error as well as any lane error, where T is the number of transfers in the frame and N is the number of bit lanes.

* * * * *